United States Patent
Izumi et al.

(10) Patent No.: US 10,546,670 B2
(45) Date of Patent: Jan. 28, 2020

(54) INSULATED WIRE WITH SOLDERED PORTION AND METHOD FOR MANUFACTURING SAME

(71) Applicants: MITSUBISHI MATERIALS CORPORATION, Tokyo (JP); MITSUBISHI CABLE INDUSTRIES, LTD., Tokyo (JP)

(72) Inventors: Reiko Izumi, Osaka (JP); Shintaro Iida, Naka (JP); Hideaki Sakurai, Naka (JP); Takeshi Ikeda, Amagasaki (JP); Ken Hayashii, Arida (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 15/506,546

(22) PCT Filed: Sep. 28, 2015

(86) PCT No.: PCT/JP2015/077350
§ 371 (c)(1),
(2) Date: Feb. 24, 2017

(87) PCT Pub. No.: WO2016/047804
PCT Pub. Date: Mar. 31, 2016

(65) Prior Publication Data
US 2017/0278595 A1 Sep. 28, 2017

(30) Foreign Application Priority Data

Sep. 28, 2014 (JP) .................................. 2014-197685

(51) Int. Cl.
*H01B 7/00* (2006.01)
*H01B 13/00* (2006.01)
(Continued)

(52) U.S. Cl.
CPC ............ *H01B 13/0016* (2013.01); *C23C 2/02* (2013.01); *H01B 3/10* (2013.01); *H01B 7/0036* (2013.01); *H01B 7/292* (2013.01)

(58) Field of Classification Search
CPC ...................................................... H01B 7/0208
(Continued)

(56) References Cited

U.S. PATENT DOCUMENTS 2,349,952 A * 5/1944 Fuller .................... H01B 7/282
174/121 SR
2,505,627 A 4/1950 Pessel
(Continued)

FOREIGN PATENT DOCUMENTS

CN 1209633 A 3/1999
JP 04-010305 A 1/1992
(Continued)

OTHER PUBLICATIONS

Office Action dated Nov. 6, 2017 for the corresponding Chinese Patent Application No. 201580047906.1.
(Continued)

*Primary Examiner* — Chau N Nguyen
(74) *Attorney, Agent, or Firm* — Leason Ellis LLP

(57) ABSTRACT

This insulated wire includes an insulating coating formed on a surface of a conductive wire body, and a soldered portion for electric conduction. The soldered portion is formed by attaching dicarboxylic acid onto a surface of the insulating coating, and by performing solder plating in a state where the dicarboxylic acid is attached onto the surface of the insulating coating. In addition, this method for manufacturing an insulated wire includes a surface treatment step of attaching the dicarboxylic acid onto a surface of an insulating coating which becomes the soldered portion, and a soldering step of performing the solder plating by immersing
(Continued)

the surface treated portion of the insulating coating in a heated solder melt.

12 Claims, 2 Drawing Sheets

(51) Int. Cl.
   *C23C 2/02* (2006.01)
   *H01B 3/10* (2006.01)
   *H01B 7/29* (2006.01)

(58) Field of Classification Search
   USPC .......................................... 174/110 R, 120 R
   See application file for complete search history.

(56) References Cited

U.S. PATENT DOCUMENTS

| | | | | |
|---|---|---|---|---|
| 5,145,722 | A | * | 9/1992 | Kaspaul ............ B23K 35/3612 148/23 |
| 5,301,253 | A | * | 4/1994 | Goodman ............ G02B 6/3855 385/125 |
| 2001/0022234 | A1 | * | 9/2001 | Okumura ............. H01R 9/0512 174/78 |
| 2010/0101827 | A1 | * | 4/2010 | Fujimoto ................ C08L 67/02 174/120 C |
| 2011/0127067 | A1 | * | 6/2011 | Honda ................ C09D 179/08 174/120 SR |
| 2013/0161065 | A1 | * | 6/2013 | Honda ..................... H01B 3/30 174/120 SR |

FOREIGN PATENT DOCUMENTS

| | | |
|---|---|---|
| JP | 06-139852 A | 5/1994 |
| JP | 07-007825 A | 1/1995 |
| JP | 2871820 B | 3/1999 |
| JP | 2002-101516 A | 4/2002 |
| JP | 2003-217961 A | 7/2003 |
| JP | 2014-013710 A | 1/2014 |

OTHER PUBLICATIONS

European Search Report dated Mar. 29, 2018 for the corresponding European Patent Application No. 15843144.5.
International Search Report dated Dec. 22, 2015 for the corresponding PCT Application No. PCT/JP2015/077350.

* cited by examiner

INSULATED WIRE WITH SOLDERED PORTION AND METHOD FOR MANUFACTURING SAME

CROSS-REFERENCE TO RELATED PATENT APPLICATIONS

This application is a U.S. National Phase Application under 35 U.S.C. § 371 of International Patent Application No. PCT/JP2015/077350, filed Sep. 28, 2015, and claims the benefit of Japanese Patent Application No. 2014-197685, filed Sep. 28, 2014, all of which are incorporated by reference in their entireties herein. The International Application was published in Japanese on Mar. 31, 2016 as International Publication No. WO/2016/047804 under PCT Article 21(2).

FIELD OF THE INVENTION

The present invention relates to an insulated wire with a soldered portion and a method for manufacturing the insulated wire. A magnet wire is known as an insulated wire. The present invention relates to an insulated wire in which a soldered portion is formed by chemically removing an insulating coating such as a magnet wire, and a method for manufacturing the insulated wire.

BACKGROUND OF THE INVENTION

In an insulated wire, a resin insulating coating is disposed on a surface of a conductive wire body such as a copper wire. In a case where the insulated wire is subjected to soldering, an insulating coating of a urethane resin is decomposed by solder heat, and thus, it is possible to perform soldering without peeling off the insulating coating. However, an insulating coating other than the urethane resin is not decomposed by the solder heat, and thus, it is necessary to remove the insulating coating in a soldered portion.

As a method of peeling off the insulating coating of the insulated wire, a method of melting or burning the insulating coating by irradiating the insulating coating with a laser beam to remove the insulating coating as described in Japanese Unexamined Patent Application, First Publication No. H7-7825 is known, and a method of cutting an outer circumference of the insulating coating by a rotating cutter to remove the insulating coating as described in Japanese Unexamined Patent Application, First Publication No. 2002-101516 is known. Further, a method of pressing the insulating coating by cutters disposed to interposing the insulated wire therebetween and of peeling off the insulating coating according to feeding of the insulated wire as described in Japanese Unexamined Patent Application, First Publication No. 2003-217961 is known.

However, the method of peeling off the insulating coating by using the laser beam has a problem of a high equipment cost. On the other hand, it is difficult to apply the method of cutting the insulating coating by rotating the cutter to a rectangular insulated wire. In addition, the method of eliminating the insulating coating by interposing the insulating coating between the cutters has a problem in which disconnection easily occurs in an insulated wire having a fine wire diameter, and it is difficult to apply the method to an ultra thin wire having a wire diameter of less than or equal to 100 µm.

Technical Problem

An object of the present invention is to provide an insulated wire including a soldered portion in which the problem of the related art is solved, and a method for manufacturing the insulated wire. In the related art, in order to form the soldered portion in the insulated wire, the insulating coating is mechanically peeled off by the cutter or is physically peeled off by the laser beam, and then, soldering is performed. In contrast, in the present invention, the insulating coating is chemically removed by a surface treatment, and thus, the soldered portion is formed. Accordingly, large-scale equipment is not required, and it is possible to simply form the soldered portion by removing the insulating coating and to manufacture the insulated wire including the soldered portion at a low cost, compared to the method of the related art.

SUMMARY OF THE INVENTION

Solution to Problem

An aspect of the present invention relates to an insulated wire including a soldered portion having a configuration described below.

[1] An insulated wire including a conductive wire body and an insulating coating formed on the surface of the conductive wire body; and a soldered portion for electric conduction, in which the soldered portion is formed by attaching dicarboxylic acids onto a surface of the insulating coating, and by performing solder plating in a state in which the dicarboxylic acids are attached onto the surface of the insulating coating.

Another aspect of the present invention relates to a method for manufacturing an insulated wire including a soldered portion having each configuration described below.

[2] A method for manufacturing an insulated wire including an insulating coating formed on a surface of a conductive wire body, and a soldered portion for electric conduction, the method including: a surface treatment step of attaching dicarboxylic acids onto a surface of an insulating coating which becomes the soldered portion; and a soldering step of performing solder plating by immersing the surface treated portion of the insulating coating in a heated solder melt.

[3] The method for manufacturing an insulated wire according to [2], in which the dicarboxylic acids are at least one selected from the group consisting of oxalic acid, malonic acid, succinic acid, glutaric acid, adipic acid, pimelic acid, suberic acid, azelaic acid, sebacic acid, fumaric acid, maleic acid, and phthalic acid.

[4] The method for manufacturing an insulated wire according to [2] or [3], in which a temperature of the solder melt is 250° C. to 400° C. (not less than 250° C. and not more than 400° C.).

[5] The method for manufacturing an insulated wire according to any one of [2] to [4], in which in the surface treatment step, the dicarboxylic acids are attached onto the surface of the insulating coating in the soldered portion by immersing a portion which becomes the soldered portion of the insulated wire in a solution of the dicarboxylic acids, and in the soldering step, the solder plating is performed by immersing a portion onto which the dicarboxylic acids are attached in the solder melt at 250° C. to 400° C.

[6] The method for manufacturing an insulated wire according to any one of [2] to [5], in which an insulated wire in which the insulating coating is formed of at least one selected from the group consisting of acrylic resin, imide resin, and ester resin is used.

[7] The method for manufacturing an insulated wire according to any one of [2] to [5], in which an insulated wire in which the insulating coating is formed by laminating a fused layer formed of at least one selected from the group consisting of polyamide resin, polyimide resin, and epoxy resin on an insulating layer formed of at least one selected from the group consisting of acrylic resin, imide resin, and ester resin is used.

[8] The method for manufacturing an insulated wire according to any one of [2] to [7], in which an insulated wire which is an ultra thin rectangular wire having a thickness of less than or equal to 50 μm and a width of less than or equal to 300 μm or an ultra thin round wire having a wire diameter of 90 to 1200 μm is used.

Advantageous Effects of Invention

In the insulated wire of the aspect of the present invention, because the soldered portion is formed by chemically peeling off the insulating coating and a mechanical load is not applied onto the insulated wire, it is possible to form a soldered portion having high reliability. In addition, in the method for manufacturing the insulated wire of the other aspect of the present invention, the insulating coating is chemically removed, and thus, equipment for mechanically or physically removing the insulating coating is not required, disconnection does not occur even in an ultra thin rectangular wire and an ultra thin round wire, and it is possible to manufacture an insulated wire including a soldered portion having high quality.

In the method for manufacturing the insulated wire of the other aspect of the present invention, since the surface treated portion of the insulating coating is immersed in the solder melt in a state where the dicarboxylic acids are attached onto the surface of the insulating coating, a treatment method is simple, and it is possible to increase productivity of the soldering of the insulated wire. In addition, in the method for manufacturing the insulated wire, because it is possible to perform the soldering at a temperature lower than that of the conventional method, it is possible to decrease a production cost.

DETAILED DESCRIPTION OF THE INVENTION

Figure 1:
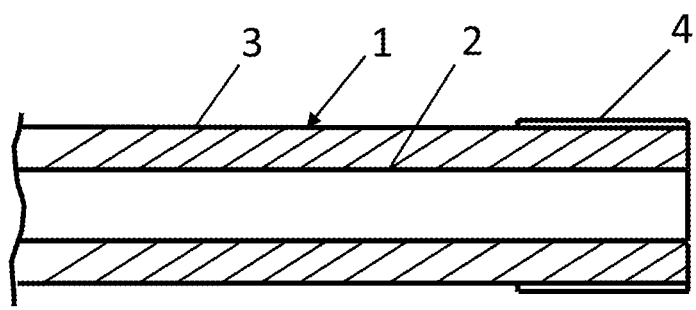
FIG. 1 is a cross section showing an insulated wire according to one or more embodiments of the present invention.

An insulated wire of an embodiment of the present invention is an insulated wire including an insulating coating formed on a surface of a conductive wire body and a soldered portion for electric conduction, and the soldered portion is formed by attaching dicarboxylic acids onto the surface of the insulating coating, and by performing solder plating in a state where the dicarboxylic acids are attached onto the surface of the insulating coating.

The material of the conductive wire body is not limited, and may be a wire body (a single wire or a twisted wire) formed of material such as a metal having conductivity, and copper, a copper alloy, silver, aluminum, or a material in which a film of a dissimilar metal is formed on such metals can be used as a specific example. In addition, any solder used from the related art such as Sn—Pb-based solder, Pb—Sn—Sb-based solder, Sn—Sb-based solder, Sn—Pb—Bi-based solder, Bi—Sn-based solder, Sn—Cu-based solder, Sn—Pb—Cu-based solder, Sn—In-based solder, Sn—Ag-based solder, Sn—Pb—Ag-based solder, and Pb—Ag-based solder can be used.

The soldered portion of the insulated wire is formed by a surface treatment step of attaching the dicarboxylic acids onto a surface of an insulating coating which becomes the soldered portion, and a soldering step of performing solder plating by immersing the surface treated portion of the insulating coating in a heated solder melt.

For example, at least one selected from the group consisting of dicarboxylic acids of (A), (B), and (C) described below can be used as a surface treatment agent which is attached onto the surface of the insulating coating.

(A) An alkyl group-based dicarboxylic acid such as oxalic acid, malonic acid, succinic acid, glutaric acid, adipic acid, pimelic acid, suberic acid, azelaic acid, and sebacic acid.

(B) An ethylene group-based dicarboxylic acid such as fumaric acid and maleic acid.

(C) A benzene ring-based dicarboxylic acid (aromatic dicarboxylic acid) such as phthalic acid.

In this embodiment, the dicarboxylic acids are heated to be a solution (melt) at a temperature slightly higher than a melting point thereof (for example, a temperature 0° C. to 100° C. higher than the melting point, but is not limited thereto), a portion of the insulated wire which is subjected to soldering is immersed in the solution of the dicarboxylic acids, and a surface treatment of attaching the dicarboxylic acids onto the surface of the insulating coating is performed. Next, the surface treated portion to which the dicarboxylic acids are attached is immersed in the heated solder melt, and soldering using solder plating is performed with respect to a portion from which the insulating coating is peeled off according to decomposition of the dicarboxylic acids.

The surface of the insulating coating of the insulated wire is subjected to the surface treatment with the dicarboxylic acids, and thus, when the surface treated portion of the insulated wire is immersed in the solder melt, for example, the dicarboxylic acids are decomposed and dehydrated by heat of the solder melt, and become an acid anhydride, and water generated at this time penetrates into the insulating coating, and hydrolyzes the insulating coating. Therefore, the insulating coating is peeled off.

The insulating coating of the insulated wire, for example, is formed of an acrylic resin such as an epoxy-based acrylic resin, an imide resin such as an aromatic imide resin, an ester-based imide resin, or an amide imide resin, or an insulating coating-forming resin such as an ester resin. In addition, there is an insulated wire in which an insulating coating is formed by laminating a fused layer on an insulating layer formed of such resins. The fused layer, for example, is disposed to be laminated on the insulating layer such that the insulated wire are mutually fused at the time of performing coil winding with respect to the insulated wire, and the fused layer is formed of a fused layer-forming resin such as a polyamide resin, a polyimide resin, or an epoxy resin.

In a case where in the surface treatment step, for example, the dicarboxylic acids are attached onto the surface of the insulating coating formed of the insulating coating-forming resin such as an acrylic resin, and in the next soldering step, the surface treated portion is immersed in the solder melt, the dicarboxylic acids which are attached onto the surface of the insulating coating are decomposed and dehydrated, and become an acid anhydride, and water generated at this time hydrolyzes a resin for forming an insulating coating. Therefore, the insulating coating is peeled off. A portion from which the insulating coating is peeled off and the surface of the conductive wire body is exposed is subjected to the solder plating, and the soldered portion is formed by the soldering.

Even in the insulated wire in which the insulating coating is formed by laminating the fused layer on the upper side of the insulating layer, the surface of the fused layer of the insulating coating is subjected to the surface treatment with the dicarboxylic acids, and thus, the insulating coating is peeled off, and the soldered portion is formed. For example, in the insulated wire where the insulating coating is formed by laminating the fused layer formed of the fused layer-forming resin such as a polyamide resin on the upper side of the insulating layer formed of the insulating coating-forming resin such as an acrylic resin, the surface of the fused layer is subjected to the surface treatment with the dicarboxylic acids, and thus, when the surface treated portion is immersed in the solder melt, the dicarboxylic acids which are attached onto the surface of the fused layer are decomposed and dehydrated, and become an acid anhydride, and water generated at this time hydrolyzes the fused layer-forming resin, and further hydrolyzes the insulating layer-forming resin on a lower side of the fused layer. Therefore, the insulating coating is peeled off, and the soldered portion is formed.

Furthermore, even in a case where the surface of the insulating coating is wet with water, water on the surface of the insulating coating is immediately evaporated by heat of the soldering, and thus, the insulating coating is not peeled off. In the method for manufacturing an insulated wire of this embodiment, the dicarboxylic acids which are attached onto the surface of the insulating coating are decomposed and dehydrated in the solder melt, and become an acid anhydride, and water generated at this time decomposes the insulating coating. Therefore, the insulating coating is reliably peeled off. According to the method for manufacturing an insulated wire of this embodiment, the insulating coating is peeled off for several seconds to several tens of seconds. Furthermore, it is not possible to obtain a sufficient effect of peeling off the insulating coating by a monocarboxylic acid or a tricarboxylic acid.

According to the method for manufacturing an insulated wire of this embodiment, the dicarboxylic acids which are attached onto the surface of the insulating coating are decomposed at 250° C. to 400° C., and thus, the soldering may be performed at a temperature of 250° C. to 400° C. Specifically, the portion of the insulating coating which is subjected to the surface treatment with the dicarboxylic acids is immersed in the solder melt which is heated to 250° C. to 400° C., and preferably 250° C. to 350° C., and thus, the portion from which the insulating coating is peeled off is subjected to the soldering using the solder plating. A soldering temperature of a general insulated wire of the related art is higher than 400° C., and thus, it is possible to perform the soldering at a temperature lower than the soldering temperature of the related art.

In the method for manufacturing an insulated wire of this embodiment, the insulating coating is chemically removed, and thus, a mechanical load is not applied onto the insulated wire. For this reason, excellent soldering can be performed with respect to the insulated wire such as an ultra thin rectangular wire having a thickness of less than or equal to 50 µm and a width of less than or equal to 300 µm or an ultra thin round wire having a wire diameter of 90 to 1200 µm.

In general, the insulated coating of the insulated wire is formed by an immersing method or an electrodeposition method. In the immersing method, a conductive wire body such as a copper wire is immersed in a resin liquid, and is pulled up and dried, and thus, an insulating coating is formed. In the electrodeposition method, a conductive wire body such as a copper wire is put into an electrodeposition liquid containing a resin component, conduction is performed through the wire body, the resin component is electrodeposited onto the surface of the wire body, and then, is subjected to a baking treatment, and thus, an insulating coating is formed. According to the method for manufacturing an insulated wire of this embodiment, even in the insulated wire where the insulating coating is formed by any one of the immersing method and the electrodeposition method, the soldered portion can be formed by peeling off the insulating coating.

According to the method for manufacturing an insulated wire of this embodiment, even in the insulated wire including the insulating coating where the fused layer is laminated on the upper side of the insulating layer, formed by the electrodeposition method or the immersing method, the fused layer and the insulating layer of the insulating coating are peeled off, and thus, the soldered portion can be formed on the peeled off portion.

In the insulated wire of the present invention, the dicarboxylic acids are attached onto the surface of the insulating coating, the insulating coating is peeled off by decomposing the dicarboxylic acids, and the soldered portion is formed on the peeled off portion by the solder plating. Therefore, a derivative of the dicarboxylic acids or an acid anhydride derivative of the dicarboxylic acids remaining in the soldered portion is frequently detected.

In the conductive wire body or the insulating coating of the insulated wire, originally, the dicarboxylic acids are not contained at all, and thus, the derivative of the dicarboxylic acids or the acid anhydride derivative of the dicarboxylic acid being detected from the soldered portion indicates that the soldered portion is formed by the method for manufacturing an insulated wire of the present invention.

In the insulated wire of the present invention, in a case where the derivative of the dicarboxylic acids or the acid anhydride of the dicarboxylic acids remaining in the soldered portion is in a trace amount, for example, the dicarboxylic acids or the acid anhydride of the dicarboxylic acids is set to a ditrimethyl silyl ester derivative, and the ditrimethyl silyl ester derivative can be detected by a gas chromatography mass spectrometer.

Figure 2:
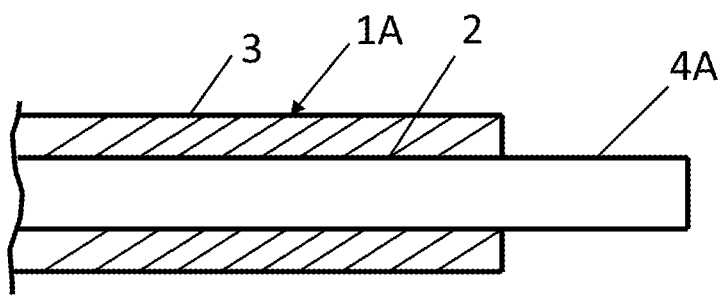
FIG. 2 is a cross section showing the insulated wire after forming a soldered portion by performing solder plating according to one or more embodiments of the present invention.

FIG. 1 is a cross section showing an insulated wire 1 according to one or more embodiments of the present invention. The insulated wire 1 includes a conductive wire body 2, an insulating coating 3 formed on a surface of the conductive wire body 2, and a surface treated portion 4 formed on a portion of the insulating coating 3. The surface treated portion 4 is formed by attaching a solution or melt of dicarboxylic acid onto a surface of the portion of the insulating coating 3. FIG. 2 is a cross section showing the insulated wire 1A after forming a soldered portion 4A by performing solder plating onto the surface treated portion 4 shown in FIG. 1.

Figure 3:
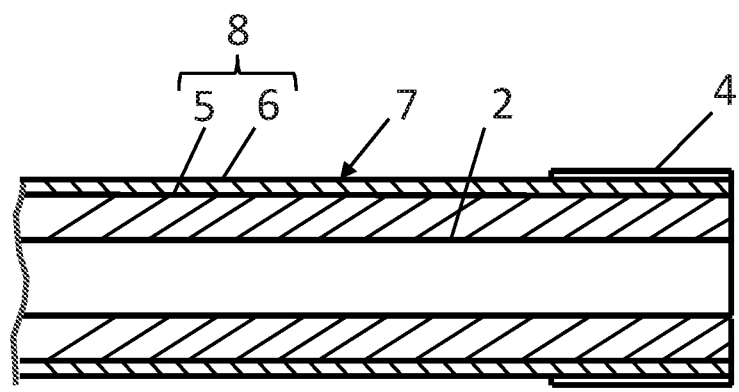
FIG. 3 is a cross section showing an insulated wire according to a second embodiment of the present invention.
Figure 4:
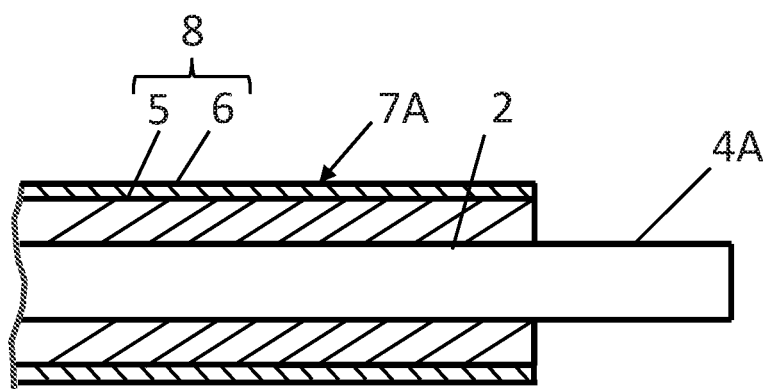
FIG. 4 is a cross section showing the insulated wire of the second embodiment on which a soldered portion is formed by performing solder plating.

FIG. 3 is a cross section showing an insulated wire 7 according to a second embodiment of the present invention. The insulated wire 7 includes the conductive wire body 2, an insulating coating 8 formed on the surface of the conductive wire body 2, and the surface treated portion 4 formed on a portion of the insulated coating 8. In the second embodiment, the insulated coating 8 has an insulating layer 5 and a fused layer 6 formed on the insulating layer 5. When the surface treated portion 4 is subjected to soldering, the soldered portion 4A is formed as shown in FIG. 4.

EXAMPLES

Hereinafter, examples of the present invention will be described along with comparative examples. Furthermore, in evaluation of a soldered portion shown in Table 1 to Table 5, when an insulated wire was pulled up from a solder melt, it was determined that a solder was attached onto a surface of a copper wire (a conductive wire body), and a case where an insulating coating did not remain in a soldered portion at all was represented by a mark of "A", and a case where a part of the insulating coating remained in the soldered portion was represented by a mark of "B". In contrast, a case where the solder was not attached onto the surface of the copper wire when the insulated wire is pulled up from the solder melt was represented by a mark of "C" as defective soldering.

Examples 1 to 3

In an insulated wire in which an insulating coating was formed as an insulating layer by an electrodeposition method and a fused layer was not formed, a surface treatment was performed by using a dicarboxylic acid shown in Table 1 as a surface treatment agent, and by immersing a portion of the insulating coating to be subjected to soldering in a solution where the dicarboxylic acid was heated and melted for 1 second to 2 seconds, and the dicarboxylic acid was attached onto the surface of the insulating coating. The surface treated portion was immersed in a solder melt at 250° C. to 350° C. for 20 seconds to 60 seconds, and the soldering was performed. As a result thereof, the insulating coating on the surface treated portion was peeled off, and solder plating was formed on the peeled off portion. The soldered portion was evaluated by visual inspection. A resin type and a layer thickness of the insulating layer, the shape of the wire body of the insulated wire, the type of the surface treatment agent, the temperature of the solder melt and an immersing time, and evaluation of the soldered portion are shown in Table 1.

Comparative Example 1

In an insulated wire in which an insulating coating was formed as an insulating layer by an electrodeposition method and a fused layer was not formed, a surface treatment was performed by using a decanoic acid shown in Table 1 as a surface treatment agent, and by immersing a portion of the insulating coating to be subjected to soldering in a solution where the decanoic acid was heated and melted for 2 seconds, and the decanoic acid was attached onto the surface of the insulating coating. The surface treated portion was immersed in a solder melt at 250° C. for 20 seconds, and the soldering was performed. As a result thereof, the insulating coating on the surface treated portion was not peeled off, and solder plating was not attached. A resin type and a layer thickness of the insulating coating, the shape of the wire body of the insulated wire, the type of the surface treatment agent, the temperature of the solder melt and an immersing time, and evaluation of the soldered portion are shown in Table 1.

Examples 4 to 6

In an insulated wire in which an insulating coating was formed as an insulating layer by an immersing method and a fused layer was not formed, a surface treatment was performed by using a dicarboxylic acid shown in Table 2 as a surface treatment agent, and by immersing a portion of the insulating coating to be subjected to soldering in a solution where the dicarboxylic acid was heated and melted for 1 second to 2 seconds, and the dicarboxylic acid was attached onto the surface of the insulating coating. The surface treated portion was immersed in a solder melt tank at 300° C. to 400° C. for 10 seconds to 120 seconds, and the soldering was performed. As a result thereof, the insulating coating on the surface treated portion was peeled off, and solder plating was formed on the peeled off portion. The soldered portion was evaluated by visual inspection. A resin type and a layer thickness of the insulating layer, the shape of the wire body of the insulated wire, the type of the surface treatment agent, the temperature of the solder melt and an immersing time, and evaluation of the soldered portion are shown in Table 2.

Comparative Example 2

In an insulated wire in which an insulating coating was formed as an insulating layer by an immersing method and a fused layer was not formed, a surface treatment was performed by using a citric acid shown in Table 2 as a surface treatment agent, and by immersing a portion of the insulating coating to be subjected to soldering in a solution where the citric acid was heated and melted for 2 seconds, and the citric acid was attached onto the surface of the insulating coating. The surface treated portion was immersed in a solder melt at 400° C. for 20 seconds, and the soldering was performed. As a result thereof, the insulating coating on the surface treated portion was not peeled off, and it was not possible to perform the soldering. A resin type and a layer thickness of the insulating coating, the shape of the wire body of the insulated wire, the type of the surface treatment agent, the temperature of the solder melt and an immersing time, and evaluation of the soldered portion are shown in Table 2.

TABLE 1

| | Insulating Coating | | Shape of Wire | | | | |
| --- | --- | --- | --- | --- | --- | --- | --- |
| | Resin Type | Layer Thickness | Body of Insulated Wire | Type of Surface Treatment Agent | Temperature of Solder Melt (° C.) | Immersing Time (Seconds) | Evaluation |
| Example 1 | Epoxy-Based Acryl | 20 | Rectangular Wire 40 × 200 | Oxalic Acid | 300 | 40 | B |
| Example 2 | Ester-Based Imide | 20 | Rectangular Wire 190 × 1900 | Adipic Acid | 350 | 60 | A |
| Example 3 | Ester | 20 | Round Wire 100φ | Maleic Acid | 250 | 20 | B |
| Comparative Example 1 | Ester | 20 | Round Wire 100φ | Decanoic Acid | 250 | 20 | C |

(Note)
The unit of the layer thickness of the insulating coating and the shape of the wire body is μm, and the evaluation is the evaluation of the soldered portion

TABLE 2

| | Insulating Coating | | Shape of Wire | | | | |
|---|---|---|---|---|---|---|---|
| | Resin Type | Layer Thickness | Body of Insulated Wire | Type of Surface Treatment Agent | Temperature of Solder Melt (° C.) | Immersing Time (Seconds) | Evaluation |
| Example 4 | Amide Imide | 20 | Rectangular Wire 40 × 200 | Succinic Acid | 400 | 45 | B |
| Example 5 | Epoxy-Based Acryl | 20 | Rectangular Wire 190 × 1900 | Suberic Acid | 300 | 10 | A |
| Example 6 | Ester-Based Imide | 20 | Round Wire 100φ | Sebacic Acid | 400 | 40 | B |
| Comparative Example 2 | Aromatic Imide | 20 | Round Wire 1000φ | Citric Acid | 400 | 120 | C |

(Note)
The unit of the layer thickness of the insulating coating and the shape of the wire body is μm, and the evaluation is the evaluation of the soldered portion Examples 7 to 16

In an insulated wire including an insulating coating which was provided with a insulating layer formed by an electrodeposition method and a fused layer formed on the insulating layer by an immersing method, a surface treatment was performed by using a dicarboxylic acid shown in Table 3 as a surface treatment agent, and by immersing a portion of the insulating coating to be subjected to soldering in a solution where the dicarboxylic acid was heated and melted for 1 second to 2 seconds, and the dicarboxylic acid was attached onto the surface of the insulating coating. The surface treated portion was immersed in a solder melt at 250° C. to 400° C. for 6 seconds to 120 seconds, and the soldering was performed. As a result thereof, the insulating coating on the surface treated portion was peeled off, and solder plating was formed on the peeled off portion. The soldered portion was evaluated by visual inspection. Resin types and layer thicknesses of the insulating layer and the fused layer, the shape of the wire body of the insulated wire, the type of the surface treatment agent, the temperature of the solder melt and an immersing time, and evaluation of the soldered portion are shown in Table 3.

Examples 17 to 19

In an insulated wire including an insulating coating which was provided with an insulating layer formed by an immersing method and a fused layer formed on the insulating layer by the immersing method, a surface treatment was performed by using a dicarboxylic acid shown in Table 4 as a surface treatment agent, and by immersing a portion of the insulating coating to be subjected to soldering in a solution where the dicarboxylic acid was heated and melted for 1 second to 2 seconds, and the dicarboxylic acid was attached onto the surface of the insulating coating. The surface treated portion was immersed in a solder melt at 250° C. to 400° C. for 30 seconds to 120 seconds, and the soldering was performed. As a result thereof, the insulating coating on the surface treated portion was peeled off, and solder plating was formed on the peeled off portion. The soldered portion was evaluated by visual inspection. Resin types and layer thicknesses of the insulating layer and the fused layer, the shape of the wire body of the insulated wire, the type of the surface treatment agent, the temperature of the solder melt and an immersing time, and evaluation of the soldered portion are shown in Table 4.

TABLE 3

| | Insulating Layer | | Fused Layer | | Shape of Wire | Type of Surface | Temperature | Immersing | |
|---|---|---|---|---|---|---|---|---|---|
| | Resin Type | Layer Thickness | Resin Type | Layer Thickness | Body of Insulated Wire | Treatment Agent | of Solder Melt (° C.) | Time (Seconds) | Evaluation |
| Example 7 | Epoxy-Based Acryl | 10 | Nylon-Based Polyamide | 3 | Rectangular Wire 40 × 200 | Glutaric Acid | 300 | 45 | A |
| Example 8 | Aromatic Imide | 10 | Nylon-Based Polyamide | 3 | Rectangular Wire 40 × 200 | Malonic Acid | 400 | 100 | B |
| Example 9 | Ester-Based Imide | 10 | Nylon-Based Polyamide | 3 | Rectangular Wire 40 × 200 | Adipic Acid | 350 | 80 | A |
| Example 10 | Amide Imide | 10 | Nylon-Based Polyamide | 3 | Rectangular Wire 190 × 1900 | Suberic Acid | 400 | 60 | A |
| Example 11 | Ester | 10 | Nylon-Based Polyamide | 3 | Round Wire 100φ | Azelaic Acid | 250 | 40 | B |
| Example 12 | Ester-Based Imide | 10 | Nylon-Based Polyamide | 3 | Round Wire 100φ | Fumaric Acid | 400 | 70 | B |
| Example 13 | Amide Imide | 10 | Nylon-Based Polyamide | 3 | Round Wire 100φ | Phthalic Acid | 400 | 70 | A |
| Example 14 | Epoxy-Based Acryl | 10 | Nylon-Based Polyamide | 3 | Rectangular Wire 20 × 100 | Glutaric Acid | 250 | 120 | A |
| Example 15 | Epoxy-Based Acryl | 5 | Nylon-Based Polyamide | 3 | Rectangular Wire 20 × 100 | Glutaric Acid | 300 | 9 | A |
| Example 16 | Epoxy-Based Acryl | 2 | Nylon-Based Polyamide | 3 | Rectangular Wire 20 × 100 | Glutaric Acid | 300 | 6 | A |

(Note)
The unit of the layer thickness of the insulating layer and the fused layer is μm the unit of the shape of the wire body is μm, and the evaluation is the evaluation of the soldered portion

TABLE 4

| | Insulating Layer | | Fused Layer | | Shape of Wire Body | Type of Surface | Temperature | Immersing | |
|---|---|---|---|---|---|---|---|---|---|
| | Resin Type | Layer Thickness | Resin Type | Layer Thickness | of Insulated Wire | Treatment Agent | of Solder Melt (° C.) | Time (Seconds) | Evaluation |
| Example 17 | Epoxy-Based Acryl | 10 | Nylon-Based Polyamide | 3 | Rectangular Wire 40 × 200 | Glutaric Acid | 300 | 60 | A |
| Example 18 | Amide Imide | 10 | Nylon-Based Polyamide | 3 | Rectangular Wire 190 × 1900 | Pimelic Acid | 400 | 80 | B |
| Example 19 | Ester-Based Imide | 10 | Nylon-Based Polyamide | 3 | Round Wire 100φ | Fumaric Acid | 250 | 30 | B |

(Note)
The unit of the layer thickness of the insulating coating and the shape of the wire body is μm, and the evaluation is the evaluation of the soldered portion Comparative Example 3

An insulated wire including an insulating coating which was provided with an insulating layer formed by an electrodeposition method and a fused layer formed on upper side of the insulating layer by an immersing method was immersed in a solder melt at 350° C. for 120 seconds without being subjected to a surface treatment, and soldering was performed, but the insulating coating was not peeled off, and it was not possible to perform the soldering. A resin type and a layer thickness of the insulating coating, the shape of the wire body of the insulated wire, the type of the surface treatment agent, the temperature of the solder melt and an immersing time, and evaluation of the soldered portion are shown in Table 5.

Comparative Examples 4 to 7

In an insulated wire including an insulating coating which was provided with an insulating layer formed by an electrodeposition method and a fused layer formed on the insulating layer by an immersing method, a surface treatment was performed by using a carboxylic acid shown in Table 5, and by immersing a portion of the insulating coating to be subjected to soldering in a solution where the carboxylic acid was heated and melted for 2 seconds, and the carboxylic acid was attached onto the surface of the insulating coating. The surface treated portion was immersed in a solder melt at 350° C. for 120 seconds, and the soldering was performed. However, the insulating coating was not peeled off, and it was not possible to perform the soldering. A resin type and a layer thickness of the insulating coating, the shape of the wire body of the insulated wire, the type of the surface treatment agent, the temperature of the solder melt and an immersing time, and evaluation of the soldered portion are shown in Table 5.

Comparative Example 8

In an insulated wire including an insulating coating which was provided with an insulating layer formed by an immersing method and a fused layer formed on the insulating layer by the immersing method, a surface treatment was performed by using a carboxylic acid shown in Table 5, and by immersing a portion of the insulating coating to be subjected to soldering in a solution where the carboxylic acid was heated and melted for 2 seconds, and the carboxylic acid was attached onto the surface of the insulating coating. The surface treated portion was immersed in a solder melt at 350° C. for 120 seconds, and the soldering was performed. However, the insulating coating was not peeled off, and it was not possible to perform the soldering. A resin type and a layer thickness of the insulating coating, the shape of the wire body of the insulated wire, the type of the surface treatment agent, the temperature of the solder melt and an immersing time, and evaluation of the soldered portion are shown in Table 5.

TABLE 5

| | | Insulating Layer | | Fused Layer | | Shape of Wire Body | Type of Surface | Temperature | Immersing | |
|---|---|---|---|---|---|---|---|---|---|---|
| | | Resin Type | Layer Thickness | Resin Type | Layer Thickness | of Insulated Wire | Treatment Agent | of Solder Melt (° C.) | Time (Seconds) | Evaluation |
| Comparative Example 3 | | Epoxy-Based Acryl | 10 | Nylon-Based Polyamide | 3 | Rectangular Wire 40 × 200 | — | 350 | 120 | C |
| Comparative Example 4 | | Imide | 10 | Nylon-Based Polyamide | 3 | Rectangular Wire 40 × 200 | Acetic Acid | 350 | 120 | C |
| Comparative Example 5 | | Ester-Based Imide | 10 | Nylon-Based Polyamide | 3 | Rectangular Wire 190 × 1900 | Decanoic Acid | 350 | 120 | C |
| Comparative Example 6 | | Amide Imide | 10 | Nylon-Based Polyamide | 3 | Round Wire 100φ | 2-Ethyl Hexanoic Acid | 350 | 120 | C |

TABLE 5-continued

| | Insulating Layer | | Fused Layer | | Shape of Wire Body of Insulated Wire | Type of Surface Treatment Agent | Temperature of Solder Melt (° C.) | Immersing Time (Seconds) | Evaluation |
|---|---|---|---|---|---|---|---|---|---|
| | Resin Type | Layer Thickness | Resin Type | Layer Thickness | | | | | |
| Comparative Example 7 | Epoxy-Based Acryl | 10 | Nylon-Based Polyamide | 3 | Round Wire 1000φ | Citric Acid | 350 | 120 | C |
| Comparative Example 8 | Epoxy-Based Acryl | 10 | Nylon-Based Polyamide | 3 | Round Wire 1000φ | 2-Ethyl Hexanoic Acid | 350 | 120 | C |

(Note)
The unit of the layer thickness of the insulating layer and the fused layer is μm, the unit of the shape of the wire body is μm, and the evaluation is the evaluation of the soldered portion In the insulated wires according to a glutaric acid treatment of Example 7, an adipic acid treatment of Example 9, a suberic acid treatment of Example 10, and an azelaic acid treatment of Example 11, the dicarboxylic acids on the soldered portions were examined according to the following sequence. In all of the examples, it was possible to detect the dicarboxylic acid.

<Measurement Method>

In order to quantitate a trace amount of dicarboxylic acid, a carboxylic acid group was set to a derivative of ditrimethyl silyl ester, and the carboxylic acid was detected by using a gas chromatography mass spectrometer "GCMS-QP2010 Plus" (product name) manufactured by Shimadzu Corporation, and by using an ionizing voltage of 70V, an emission current of 200 μA, and peaks of measured mass-to-charge ratio of m/z=73 and m/z=75 as an index.

<Preparation of Sample>

Each sample was subjected to ultrasonic washing by being dipped in hot water, and was subjected to ultrasonic washing by being dipped in acetone. The acetone solution from each sample was heated at 40° C. under a nitrogen gas atmosphere to volatilize and concentrate, and the concentrated solution was put into a measurement cell. A mixed reagent of trimethyl silyl trifluoroacetamide and a trace amount of trimethyl chlorosilane was added to the acetone solution as a derivatizing reagent to set a constant volume, and heating was performed at 70° C. for 20 minutes. Therefore, the measurement sample was obtained.

INDUSTRIAL APPLICABILITY

According to the present invention, since the soldered portion is formed by chemically peeling off the insulating coating, a soldered portion having high reliability can be formed without applying a mechanical load onto an insulated wire. Therefore, the present invention has industrial applicability.

The invention claimed is:

1. An insulated wire comprising:
a conductive wire body,
an insulating coating formed on a surface of the conductive wire body; and
a surface treated portion formed on a portion of the insulating coating,
wherein the surface treated portion is formed by attaching a solution or melt of dicarboxylic acid onto a surface of the portion of the insulating coating, and
wherein the insulating coating is formed by laminating a fused layer formed of at least one resin selected from a group consisting of polyamide resin, polyimide resin, and epoxy resin on an insulating layer formed of at least one resin selected from a group consisting of acrylic resin, imide resin, and ester resin.

2. A method for manufacturing a soldered insulated wire using the insulated wire according to claim 1, the method comprising:
a soldering step of performing solder plating by immersing the surface treated portion of the insulating coating in a heated solder melt.

3. The method for manufacturing a soldered insulated wire according to claim 2,
wherein the dicarboxylic acid is at least one selected from a group consisting of oxalic acid, malonic acid, succinic acid, glutaric acid, adipic acid, pimelic acid, suberic acid, azelaic acid, sebacic acid, fumaric acid, maleic acid, and phthalic acid.

4. The method for manufacturing a soldered insulated wire according to claim 2,
wherein a temperature of the solder melt is not less than 250° C. and not more than 400° C.

5. The method for manufacturing a soldered insulated wire according to claim 2,
wherein during surface treatment of the insulating coating, the dicarboxylic acid is attached onto the surface of the insulating coating by immersing a portion of the insulated wire in the solution of the dicarboxylic acid, and wherein in the soldering step, the solder plating is performed by immersing a portion of the insulating coating onto which the dicarboxylic acid is attached, in the solder melt at not less than 250° C. and not more than 400° C.

6. The method for manufacturing a soldered insulated wire according to claim 2,
wherein the insulating coating is formed of at least one resin selected from a group consisting of acrylic resin, imide resin, and ester resin.

7. The method for manufacturing a soldered insulated wire according to claim 2,
wherein the insulated wire is an ultra thin rectangular wire having a thickness of less than or equal to 50 μm and a width of less than or equal to 300 μm or an ultra thin round wire having a wire diameter of 90 to 1200 μm.

8. The insulating wire according to claim 1,
wherein the dicarboxylic acid is at least one acid selected from a group consisting of oxalic acid, malonic acid, succinic acid, glutaric acid, adipic acid, pimelic acid, suberic acid, azelaic acid, sebacic acid, fumaric acid, maleic acid, and phthalic acid.

9. The insulating wire according to claim 1,
wherein the dicarboxylic acid is at least one acid selected from a group consisting of oxalic acid, malonic acid, succinic acid, glutaric acid, adipic acid, pimelic acid, suberic acid, azelaic acid, sebacic acid, fumaric acid, and maleic acid.

10. The insulating wire according to claim 1,
wherein the insulating coating is formed of at least one resin selected from a group consisting of acrylic resin, imide resin, and ester resin.

11. The insulating wire according to claim 1,
wherein the insulated wire is an ultra thin rectangular wire having a thickness of less than or equal to 50 µm and a width of less than or equal to 300 µm or an ultra thin round wire having a wire diameter of 90 to 1200 µm.

12. The insulating wire according to claim 1,
wherein the surface treated portion is configured to be removed by performing solder plating, but the remaining portion of the insulating coating is not removed.

* * * * *